Patented Apr. 21, 1936

2,037,734

UNITED STATES PATENT OFFICE 2,037,734

CRYSTALLIZING LACQUER

Theodore A. Neuhaus, Lakewood, Ohio, assignor to The Glidden Company, Cleveland, Ohio, a corporation of Ohio No Drawing. Application May 4, 1934, Serial No. 723,875

9 Claims. (Cl. 134—79)

This invention relates to nitrocellulose lacquers, and has particular reference to that type of lacquer known as crystallizing lacquer, which contains a crystalline material soluble in the lacquer but insoluble in the dried film, so that in drying it crystallizes out of the film into a definite crystalline design. More particularly, this invention refers to a crystallizing lacquer which may be applied by an ordinary paint brush, and yet will dry with a definite crystal design.

Crystallizing lacquers are old in the art. They consist essentially of solutions of nitrocellulose, with or without plasticizer and resins, to which solutions are added crystallizable materials such as naphthalene, and phthalic anhydride. The proper adjustment of the various ingredients, and the proper choice of solvents, has a great influence on the resultant film. Some crystallization is almost always obtained; but uniform crystallization of good-looking films requires careful adjustment of the ingredients. This necessity for adjustment is well known to the art; and a formula must be adjusted each time it is made, at least to a slight extent.

Not only is careful adjustment of the formula necessary, but care must be taken in application. The laws of crystallization govern the appearance of the film; speed of crystallization, the presence or absence of seeding centers, and regularity of dry are important factors. As a result, dust (seeding) and drafts (irregularity of dry) should be avoided; while changes in temperature and humidity play important roles in the film design formation.

It has been customary to apply crystallizing lacquers by spray, as this assures, with skilled workmen, a smooth film which will dry evenly. The sprayed pieces are ordinarily placed in a room free from drafts, where the temperature does not vary widely; and uniformly good results have been obtained by such application.

Attempts to apply crystallizing lacquer by brushing have been less successful, even where conditions of dry can be controlled. The brush, of course, leaves a slightly uneven film, which flows out slowly, tending to eliminate brush marks; but the general tendency is for crystallization to start before flow is complete. Seeding centers are formed; and the crystallization proceeds unevenly, to give an irregularly crystalline film of unpleasant appearance.

When amateurs attempt to apply crystallizing lacquer by brushing, the results, of course, are even less satisfactory than when professional finishers do the work. This has definitely eliminated crystallizing lacquer from the products which could be offered to the public for home use; such attempts as have been made in the past have attracted interest because of the unusual beauty of finish possible, but have not been successful because results were not satisfactory.

I have discovered that crystallizing lacquers can be made to yield satisfactory designs on brush application, even by amateurs, if the ordinary crystallizing lacquers, designed for spray work, are increased in viscosity and non-volatile content by the removal of fast-evaporating solvents. The necessary viscosity range is far above that ordinarily used for brushing lacquers; and I believe the superior results to be due to the fact that the high-solids, high viscosity material must be flowed on by the brush, so that there can be no very thin spots. As a result, flow is complete before crystallization starts, and no seeding occurs; the film then has an opportunity to dry evenly.

As is well known in the art, an ordinary spraying lacquer may be applied at varying viscosities, depending on the type of film desired. Crystallizing lacqeurs are ordinarly applied at a viscosity of about 45 seconds, on a #4 Ford cup (a standard efflux viscosimeter in the lacquer trade) at 80° F. This is just at the lower limit of brushing viscosity, which ranges from 45 seconds to about 90 seconds. Crystallizing lacquers applied by brushing, with viscosities in the indicated range, do not give uniform crystalline films.

When the viscosity, however, is raised to 150 seconds, by elimination of solvent, (particularly the fast-evaporating ingredients) the resultant lacquer may be applied by a brush, and will yield evenly drying films under most conditions. Cross-brushing, of course, should be avoided; dust and drafts are likewise harmful influences, just as in the case of spray-applied lacquers.

The viscosity may be run up from 150 seconds to the point where the lacquer is too viscous to run off a brush, and flow out. In general, viscosities above 300 seconds are too high to yield good results. Viscosities as low as 120 seconds may be used; but drying conditions must be good, and skilled application is necessary.

As an example of my invention, a typical spraying crystallizing lacquer may be used as a starting point. A formula as follows:

34 liquid ounces 1000 second nitrocellulose solution, (made up by dissolving 164 pounds of the 30% alcohol-wet nitrocellulose in 62½ gallons ethyl acetate, 31½ gallons butyl acetate, 62½ gallons alcohol, and 94 gallons toluol)

5 liquid ounces of "Anon" (cyclohexanone)

19 liquid ounces of amyl alcohol

½ liquid ounce of butyl cellosolve 4 liquid ounces of a 6 pound cut of damar, dewaxed in toluol-alcohol ½ liquid ounce of "Hercosol 80" (a pine derivative)

3 ounces of camphor.

45 liquid ounces of a 20% solution of naphthalene in benzol will yield a lacquer of 45″ viscosity on a #4 Ford cup at 80° F., and will give excellent results on spray application. Brush application, however, gives very poor results.

If now we replace the solution of naphthalene in benzol, with solid naphthalene, we have a material of the following composition:

34 liquid ounces nitrocellulose solution (as above)
5 liquid ounces "Anon"
19 liquid ounces amyl alcohol
½ liquid ounce mono butyl ether of ethylene glycol
4 liquid ounces of resin solution
½ liquid ounce of "Hercosol 80"
3 ounces camphor
8 ounces naphthalene.

This lacquer has a viscosity of 160 seconds in a #4 Ford cup, at 80° F.; on a plastometer, the viscosity of this lacquer was 5.6 poises at 80° F. The lacquer of this example may be applied by brushing, and will yield evenly crystallized films of very pleasing appearance.

Another crystallizing lacquer which may be treated in a similar manner is made up of 40 liquid ounces of 1000 second solution (as above)
44 liquid ounces of naphthalene solution (as above)
2 liquid ounces of raw tung oil.
1 liquid ounce of a 6 pound cut of run kauri in toluol
4 liquid ounces of ethyl acetate
6 liquid ounces of mono butyl ether of ethylene glycol
40 liquid ounces of amyl alcohol
4 ounces of camphor.

This gives a viscosity of 30-35 seconds on a #4 Ford cup; on removal of the ethyl acetate, and replacement of the naphthalene solution by 8 ounces of naphthalene, a satisfactory brushing material is obtained with a viscosity of 180 seconds.

Another type of crystallizing lacquer, using alkyd resin, is made up of

3½ ounces by weight of Rezyl 17
4 ounces by weight of 5 second nitrocellulose (30% alcohol)
1 ounce by weight of bold Batavia damar
10 ounces by weight of naphthalene
5 liquid ounces of methyl Anon (methyl cyclohexanone)
7 liquid ounces of amyl acetate
10 liquid ounces of ethyl acetate
23¼ liquid ounces of V. M. & P. naphtha
4 liquid ounces of toluol
6¼ liquid ounces of hexalin
½ liquid ounce of castor oil.

This is a good crystallizing lacquer for spray application, giving a pheasant feather effect. Its viscosity is 45". For brush application, low boiling solvent should be removed to give a formula as follows:

3½ ounces Rezyl 17
4 ounces nitrocellulose
1 ounce damar
10 ounces naphthalene
5 liquid ounces methyl Anon
7 liquid ounces amyl acetate
2 liquid ounces ethyl acetate
13¼ liquid ounces V. M. & P. naphtha
2 liquid ounces toluol
6¼ liquid ounces hexalin
½ ounce castor oil.

to give a lacquer with a viscosity of 180 seconds.

In all of the above formulas, it should be remembered that the nitrocellulose varies in viscosity, and adjustments should be made by the use of high viscosity nitrocellulose, in the manner well known to the art.

This same improvement in the properties of other nitrocellulose crystallizing lacquers such as those made with phthalic anhydride may be made by removing low boiling solvent therefrom, to increase the solid content and the viscosity. I prefer, however, to use naphthalene, as phthalic anhydride lacquers tend to lose crystallizing power on prolonged standing.

The same solvent combination may be kept, merely increasing the percentage of all ingredients, in the case of crystallizing lacquers which have, initially, solvent combinations without substantial percentages of very low boiling materials.

Brushing crystallizing lacquers may, of course, be formulated without regard to existing formulas, without departing from the spirit of this invention, by keeping the viscosity at or above 150 seconds on a #4 Ford cup at 80° F., using the known ingredients of the old crystallizing lacquers.

I claim:

1. A nitrocellulose crystallizing lacquer ready for brush application, characterized by a viscosity of at least 120 seconds on a #4 Ford cup at 80° F.

2. A nitrocellulose crystallizing lacquer ready for brush application, characterized by a viscosity of 150-300 seconds on a #4 Ford cup at 80° F.

3. A nitrocellulose lacquer ready for brush application, comprising a lacquer and a crystallizing agent dissolved therein, said lacquer having a viscosity of at least 120 seconds on a #4 Ford cup at 80° F.

4. A nitrocellulose lacquer ready for brush application, comprising a lacquer and naphthalene dissolved therein, said lacquer having a viscosity of at least 120 seconds on a #4 Ford cup at 80° F.

5. A brushable lacquer comprising a solution of nitrocellulose, resin, plasticizer and a crystallizing agent in volatile solvents, said solution having a viscosity of at least 120 seconds on a #4 Ford cup at 80° F.

6. A brushable lacquer comprising a solution of nitrocellulose, resin, plasticizer and naphthalene in volatile solvents, said solution having a viscosity of at least 120 seconds on a #4 Ford cup at 80° F.

7. A nitrocellulose crystallizing lacquer ready for brush application, comprising a solution of nitrocellulose and a crystallizing agent in a mixed volatile solvent, the solvent containing sufficient slow-evaporating ingredients to permit of proper crystallization of the lacquer, and sufficient rapid-evaporating ingredients to produce a viscosity of at least 120 seconds on a #4 Ford cup at 80° F.

8. A nitrocellulose crystallizing lacquer ready for brush application, comprising a solution of nitrocellulose and a naphthalene in a mixed volatile solvent, the solvent containing sufficient slow-evaporating ingredients to permit of proper crystallization of the lacquer, and sufficient rapid-evaporating ingredients to produce a viscosity of at least 120 seconds on a #4 Ford cup at 80° F.

9. A nitrocellulose crystallizing lacquer ready for brush application, comprising a solution of nitrocellulose and a crystallizing agent in a mixed volatile solvent, the solvent containing sufficient slow-evaporating ingredients to permit of proper crystallization of the lacquer, and sufficient rapid-evaporating ingredients to produce a viscosity of 150-300 seconds on a #4 Ford cup at 80° F.

THEODORE A. NEUHAUS.